United States Patent
Styczynski

(10) Patent No.: US 6,692,677 B2
(45) Date of Patent: *Feb. 17, 2004

(54) METHOD FOR MOLDING AND CURING SILICONE

(76) Inventor: Robert J. Styczynski, 10 Sunset Dr., Latham, NY (US) 12110

( * ) Notice: Subject to any disclaimer, the term of this patent is extended or adjusted under 35 U.S.C. 154(b) by 129 days.

This patent is subject to a terminal disclaimer.

(21) Appl. No.: 09/850,490

(22) Filed: May 7, 2001

(65) Prior Publication Data

US 2001/0017430 A1 Aug. 30, 2001

Related U.S. Application Data

(60) Continuation of application No. 09/538,214, filed on Mar. 30, 2000, now Pat. No. 6,238,195, which is a division of application No. 08/743,314, filed on Nov. 5, 1996, now Pat. No. 6,113,827.

(51) Int. Cl.$^7$ .............................................. B29C 45/00
(52) U.S. Cl. ............... 264/257; 264/328.2; 264/328.11; 264/328.15; 264/328.16; 425/120; 425/121; 425/127; 425/543; 425/548
(58) Field of Search ............... 264/328.15, 328.16, 264/328.1, 327, 161, 257, 328.4, 328.2, 328.11, 328.14, 271.1, 275, 259; 425/549, 557, 548, 543, 120, 121, 127, 130

(56) References Cited

U.S. PATENT DOCUMENTS

| | | | |
|---|---|---|---|
| 3,107,234 A | 10/1963 | Stewart | |
| 3,797,984 A | 3/1974 | Yago et al. | 425/243 |
| 4,092,385 A | 5/1978 | Balevski et al. | 264/45.5 |
| 4,152,798 A | 5/1979 | Akaura et al. | |
| 4,201,742 A | 5/1980 | Hendry | 264/45.5 |
| 4,238,181 A | 12/1980 | Dannels et al. | 425/543 |
| 4,298,332 A | 11/1981 | Aoki | 425/570 |
| 4,334,847 A | 6/1982 | Schauffele | 425/227 |
| 4,363,849 A | 12/1982 | Paisley et al. | 428/318.8 |
| 4,442,055 A | 4/1984 | Oelsch et al. | 264/105 |
| 4,620,958 A | 11/1986 | Wiechard | 264/297.2 |
| 4,687,434 A | 8/1987 | Beglinger | 425/556 |
| 4,732,724 A | 3/1988 | Sterner | 264/251 |
| 4,865,793 A | 9/1989 | Suzuki et al. | 264/278 |
| 4,867,938 A | 9/1989 | Schad et al. | 264/297.2 |
| 4,963,208 A | 10/1990 | Muncy et al. | 156/145 |
| 4,981,634 A | 1/1991 | Maus et al. | 264/102 |
| 5,044,925 A | 9/1991 | Watanabe | 425/542 |
| 5,110,514 A | 5/1992 | Soane | 264/22 |
| 5,196,152 A | 3/1993 | Gamache et al. | 264/163 |
| 5,230,856 A | 7/1993 | Schellenbach | 264/328.1 |
| 5,236,657 A | 8/1993 | Waldenrath et al. | 264/510 |
| 5,244,608 A | 9/1993 | Andersen | 264/26 |
| 5,262,105 A | 11/1993 | Komiyama et al. | 264/85 |
| 5,309,840 A | 5/1994 | Takamura et al. | 101/488 |
| 5,344,601 A | 9/1994 | Newton | 264/255 |
| 5,427,519 A | 6/1995 | Gellert | 425/549 |

(List continued on next page.)

Primary Examiner—Jill L. Heitbrink
(74) Attorney, Agent, or Firm—Heslin Rothenberg Farley & Mesiti P.C.; Victor A. Cardona, Esq.

(57) ABSTRACT

An apparatus and method for molding and curing silicone includes a press, one nozzles operatively engaged to the press, a liquid cooled manifold plate disposed to cool the nozzles, a heatable top platen having nozzle receptacles therein to receive the nozzles therein and a mold plate having a mold cavity therein. The mold plate and top platen are oriented for placement in the injecting position to allow the top platen to contact the mold plate while the nozzles are inserted into the nozzle receptacles of the top platen so that silicone is injected into the mold plate and into the mold cavity. The apparatus may be placed in the curing position when the top platen is heated and contacts the mold plate to allow silicone injected in mold plate to cure. The apparatus may be placed in a home position where the mold plate is uncontacted by the heated top platen which is uncooled by the manifold plate in the home position.

23 Claims, 6 Drawing Sheets

U.S. PATENT DOCUMENTS

| | | | |
|---|---|---|---|
| 5,447,425 A | 9/1995 | Hsu et al. | 425/149 |
| 5,458,719 A | 10/1995 | Pall et al. | 156/285 |
| 5,681,519 A | 10/1997 | Kelman | 264/257 |
| 5,914,082 A | 6/1999 | Harrison | 264/251 |
| 5,928,593 A | 7/1999 | Harrison | 264/251 |
| 5,939,004 A | 8/1999 | Harrison | 264/251 |
| 6,113,827 A * | 9/2000 | Styczynski | 264/161 |
| 6,139,787 A * | 10/2000 | Harrison | 264/247 |
| 6,238,195 B1 * | 5/2001 | Styczynski | 425/120 |

* cited by examiner

INJECTION/ CLOSED POSITION
MOLD SYSTEM CLOSED
SILICONE BEING INJECTED

HOME POSITION
MOLD SYSTEM OPEN
APPAREL PLACED IN PRESS

METHOD FOR MOLDING AND CURING SILICONE

RELATED APPLICATIONS

This application is a continuation of U.S. Ser. No. 09/538,214, filed Mar. 30, 2000, now U.S. Pat. No. 6,238,195 which is a divisional of U.S. Ser. No. 08/743,314, filed Nov. 5, 1996, now U.S. Pat. No. 6,113,827.

FIELD OF THE INVENTION

This invention relates to molding of silicone, and more particularly, to a method and apparatus for molding and curing silicone.

BACKGROUND OF THE INVENTION

Presently, silicone is molded using a press which holds a heated top and bottom mold cavity while the liquid silicone is injected into the mold using a pump. After the silicone is cured under heat, the press is lifted, the mold is separated and the molded silicone part is removed. The typical mold comprises a top mold plate which contains a mold cavity and a runner cavity. The silicone is injected under pressure into the runner cavity where it flows into the mold cavity. When the silicone cures, the silicone remaining in the runner cavity, referred to as runner silicone, must then be separated from the remaining silicone and the runner cavity.

One problem with the conventional techniques for molding silicone is that the hot mold cannot normally be handled manually. This problem has prevented the development of a molding and curing system which can be used to mold silicone onto a substrate such as fabric.

There exists a need to facilitate an apparatus which will allow silicone to be molded onto a substrate such as fabric while minimizing the propensity for the operator to be burned by a hot mold plate. There also exists a need to facilitate the prompt removal of runner silicone during the molding process.

SUMMARY OF THE INVENTION

The aforementioned needs may be achieved and the aforementioned problems may be solved, using the apparatus for curing and injecting silicone constructed in accordance with the principles of the present invention.

In accordance with the invention, the apparatus for molding and curing silicone includes a press, one or more injection nozzles operatively engaged to the press, a liquid cooled manifold plate disposed to cool the nozzles, a heatable top platen having one or more receptacles therein to receive the nozzles therein, and a mold plate having a mold cavity therein. The top platen is kept at a constant elevated temperature. The mold plate and top platen are also oriented for placement in an injecting position to allow the top platen to contact the mold plate while the nozzles are inserted into the nozzle receptacles of the top platen wherein silicone is injected into the mold plate through the nozzles and into the mold cavity.

The mold plate and top platen are oriented for placement in a curing position so that the heated top platen contacts the mold plate to allow silicone injected within the mold plate to cure. When in the curing position, the nozzle is outside of the receptacle of the top platen and the top platen is uncooled by the manifold plate.

The top platen and mold plate are also oriented for placement in a home position. In this position, the nozzles are located outside of the receptacles of the top platen, and the mold plate is uncontacted by the top platen.

The mold plate is typically located on a bottom platen when in the injecting position. The bottom platen is kept at a constant elevated temperature.

The mold plate includes a runner cavity which is in silicone flow relationship with the mold cavity when the nozzles are placed in silicone flow relationship with the runner cavity and the top platen and mold plate are in the injecting position.

A runner remover may be used to remove runner silicone from within the mold cavity. The runner remover may include a plurality of fingers which are placed within the runner cavity when the mold plate and top platen are in the injection position. The fingers are disposed to lift the runner silicone out of the runner cavity when the top platen and mold plate are placed in the home position. This may be accomplished by orienting the fingers so that they are slidably engaged to the top platen. The fingers may be spring loaded into the top platen. The runner remover may further include means for disengaging the silicone runner from the fingers, such as a plurality of tines.

The top platen of the apparatus may be linearly translatable relative to the nozzles and the manifold plate. The mold plate may also be linearly translatable relative to the top platen and the nozzles. The apparatus may also include a means for aligning the nozzles, the top platen, and the mold plate, with each other. The means for aligning may include at least one pin, and preferably four pins, axially aligned through the manifold plate, the top platen and the mold plate.

The apparatus may further include a first biasing means between the top platen and the manifold plate, and a second biasing means between the top platen and the mold plate. The first biasing means may include one or more springs located between the manifold plate and the top platen. Preferably, four springs may be located therebetween. The second biasing means may include one or more springs located between the top platen and the mold plate. Preferably, four springs may be located therebetween. The biasing means biases the top platen and mold plate in the home or open position.

The apparatus may further include a means for holding a substrate upon the bottom platen. The means may include at least one pressure activated push rod. The push rod may be operatively connected to a fluid, such as air cylinder.

The invention also includes a method of molding and curing silicone. The method involves aligning one or more injection nozzles into nozzle receptacles of a top platen, cooling the nozzles using liquid, placing the nozzles relative to a mold plate using a press and injecting silicone into a mold cavity within the mold plate under pressure, curing the injected silicone by heating the top platen and contacting the mold plate with the heated top platen. The heating step may include removing the nozzles from within the nozzle receptacles, and maintaining the heated top platen on the mold plate.

The nozzles may be located within a manifold plate and the cooling step may involve flowing cooling liquid into the manifold plate. The heated top platen may be lifted off of the mold plate after the silicone within the mold cavity has cured. The mold plate may include a runner cavity in silicone flow relationship to the mold cavity, and the method may further include removing runner silicone from the runner cavity. The silicone may be injected onto a substrate maintained in position on a heated bottom platen during the injection step. The substrate may be a fabric material, and the silicone may be injected and cured onto the fabric. The method may be performed using the apparatus of the present invention.

BRIEF DESCRIPTION OF THE DRAWINGS

The invention may best be understood by reading the detailed description thereof, in conjunction with the drawings in which.

DETAILED DESCRIPTION

Figure 1:
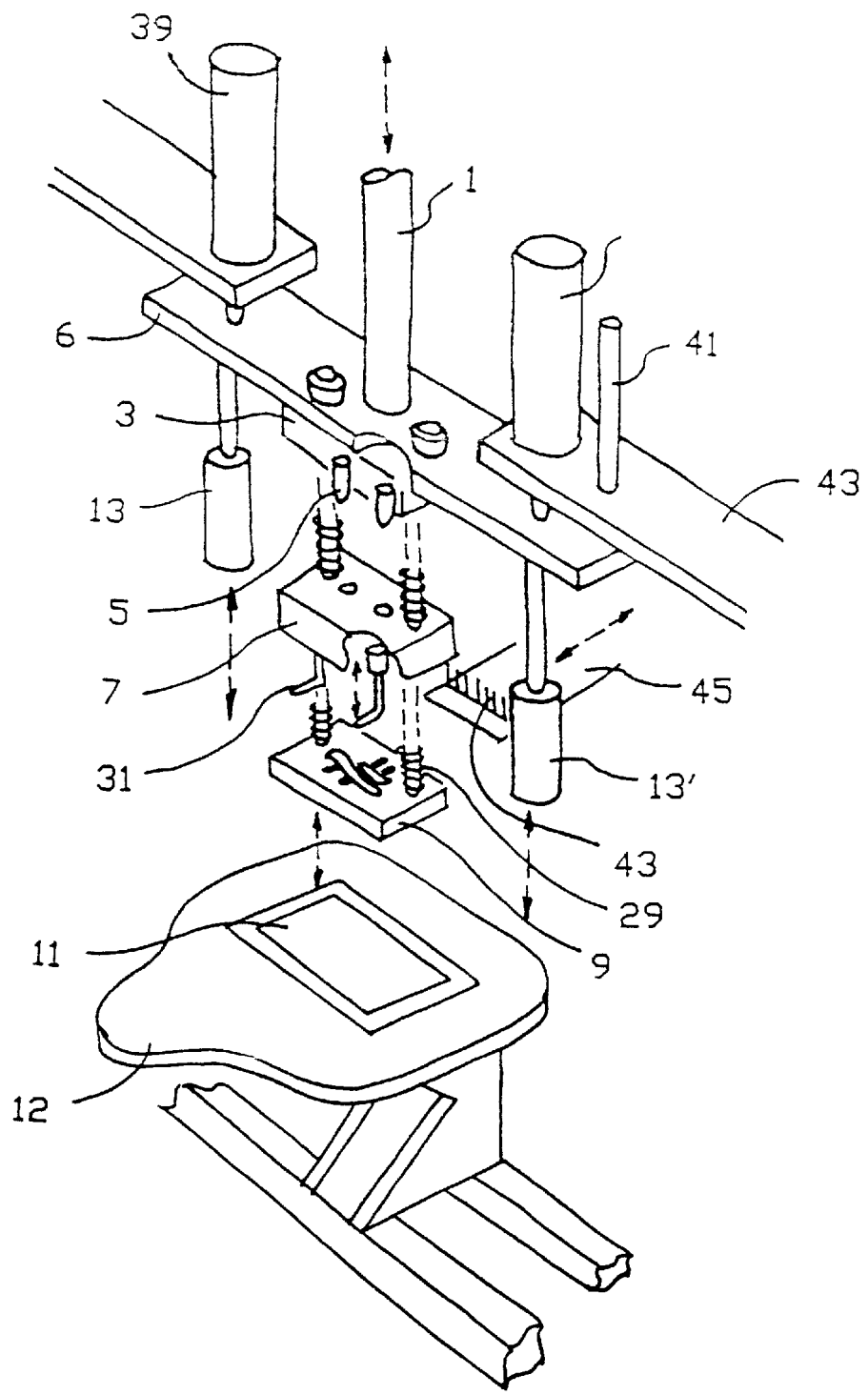
FIG. 1 depicts a schematic representation of the apparatus for molding and curing silicone constructed in accordance with the present invention.

Referring to FIGS. 1–5, the apparatus for molding and curing silicone constructed in accordance with the principles of the present invention is shown. The apparatus includes a press 1 having a linearly translatable ram, (referred to herein as "press"). At the end of the press 1 is a manifold 3 having injection nozzles 5 therein. The press 1 is connected to a top plate 6 and moves relative therethrough along its linearly translatable axis. Operatively connected to the manifold is a top platen 7 which is located between the manifold 3 and a mold plate 9. The mold plate 9 is also operatively connected to the press 1 and top platen 7. Located between the mold plate 9 along the axis of linear translation of the press 1, is a bottom platen 11. When the press is activated, the mold plate is pushed onto the bottom platen 11. The bottom platen 11 is, preferably, surrounded by a water cooled template table 12 and is adapted to support a substrate thereon for the molding of silicone rubber. The apparatus further includes a means for holding the substrate onto the bottom platen. This means may include one or more pressure activated push rods 13, 13'.

Figure 2:
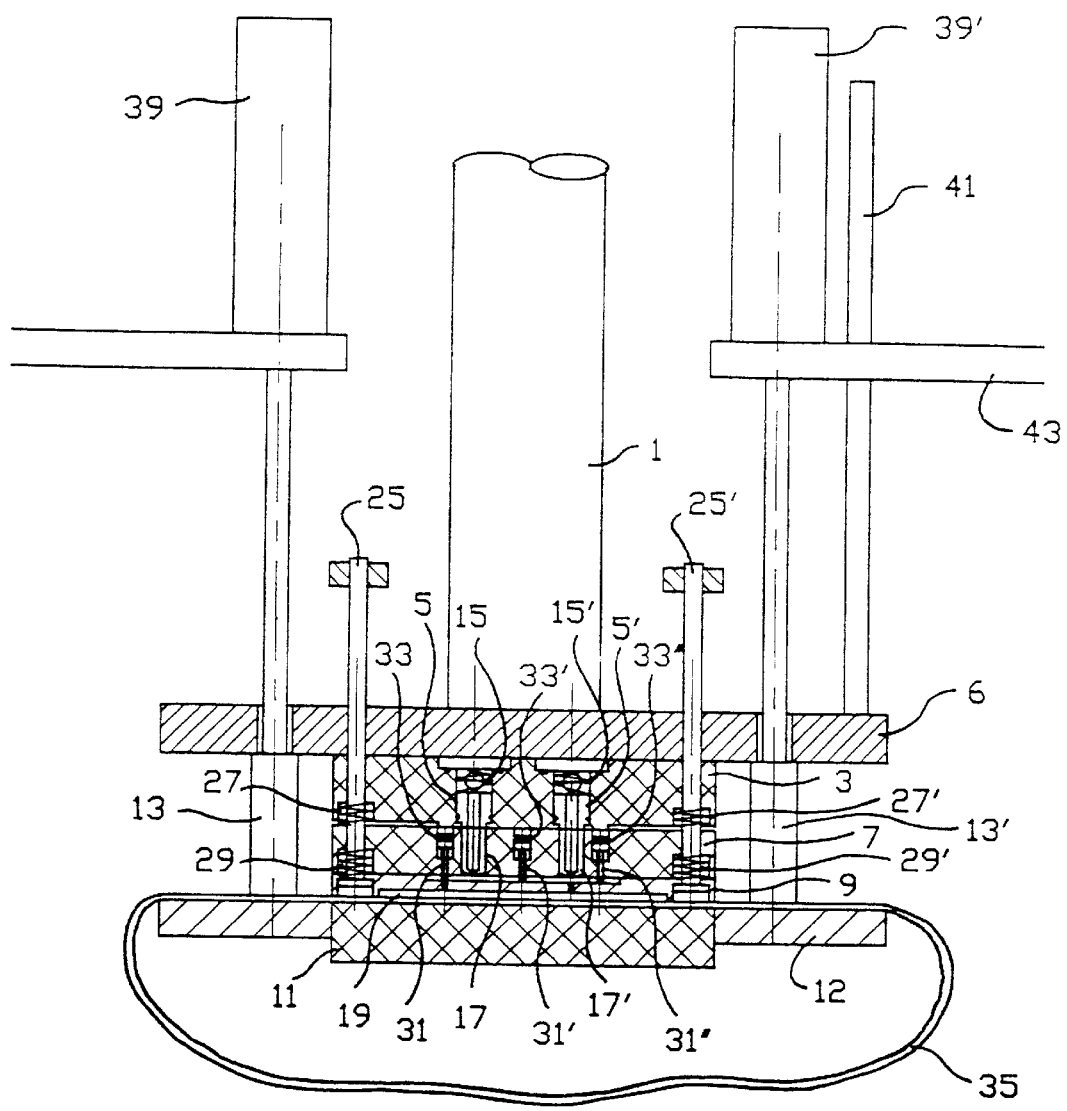
FIG. 2 depicts a front view of the apparatus for molding and curing silicone constructed in accordance with the principles of the present invention in the injecting position with a substrate of fabric material placed between a mold plate and bottom platen.
Figure 3:
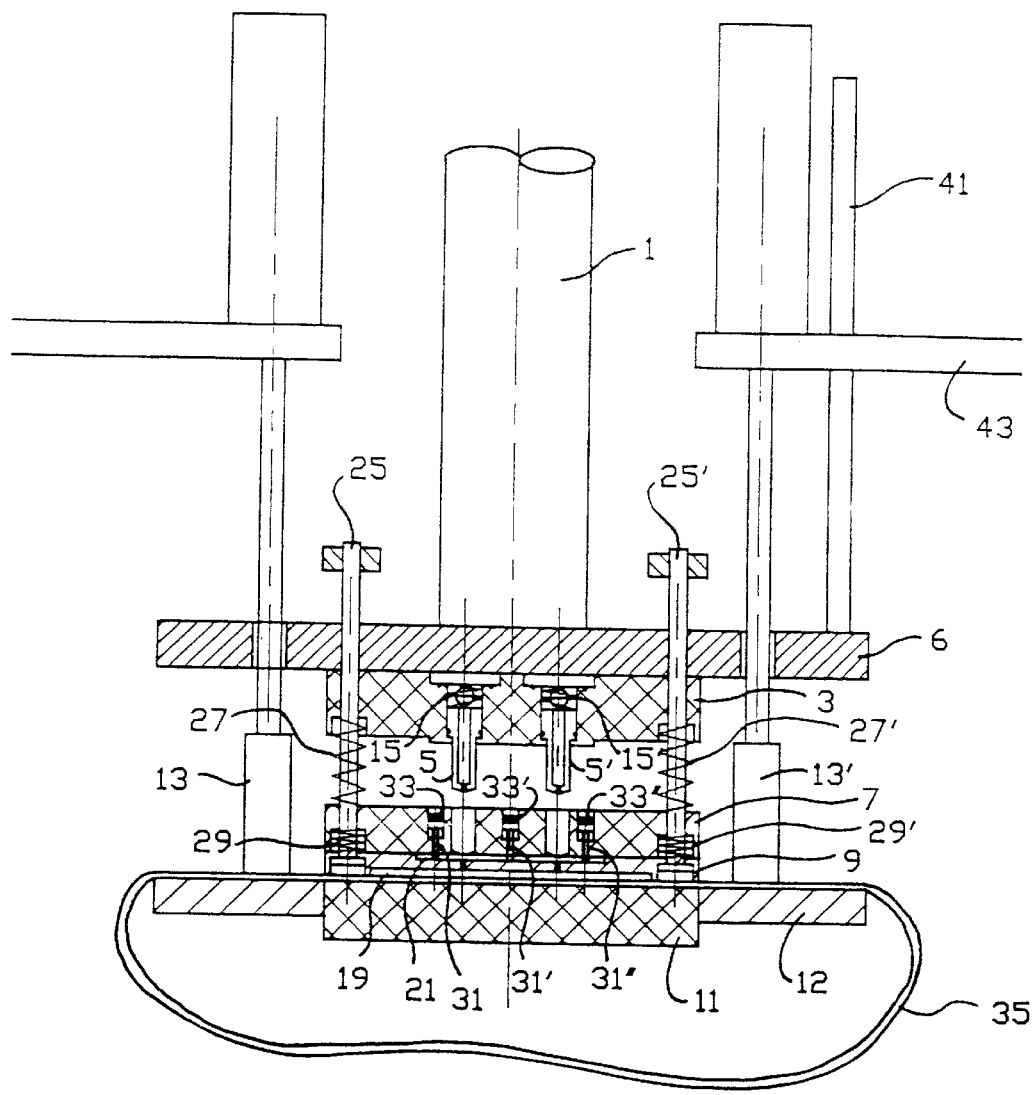
FIG. 3 depicts a front view of the apparatus depicted in FIG. 2 in the curing position.
Figure 4:
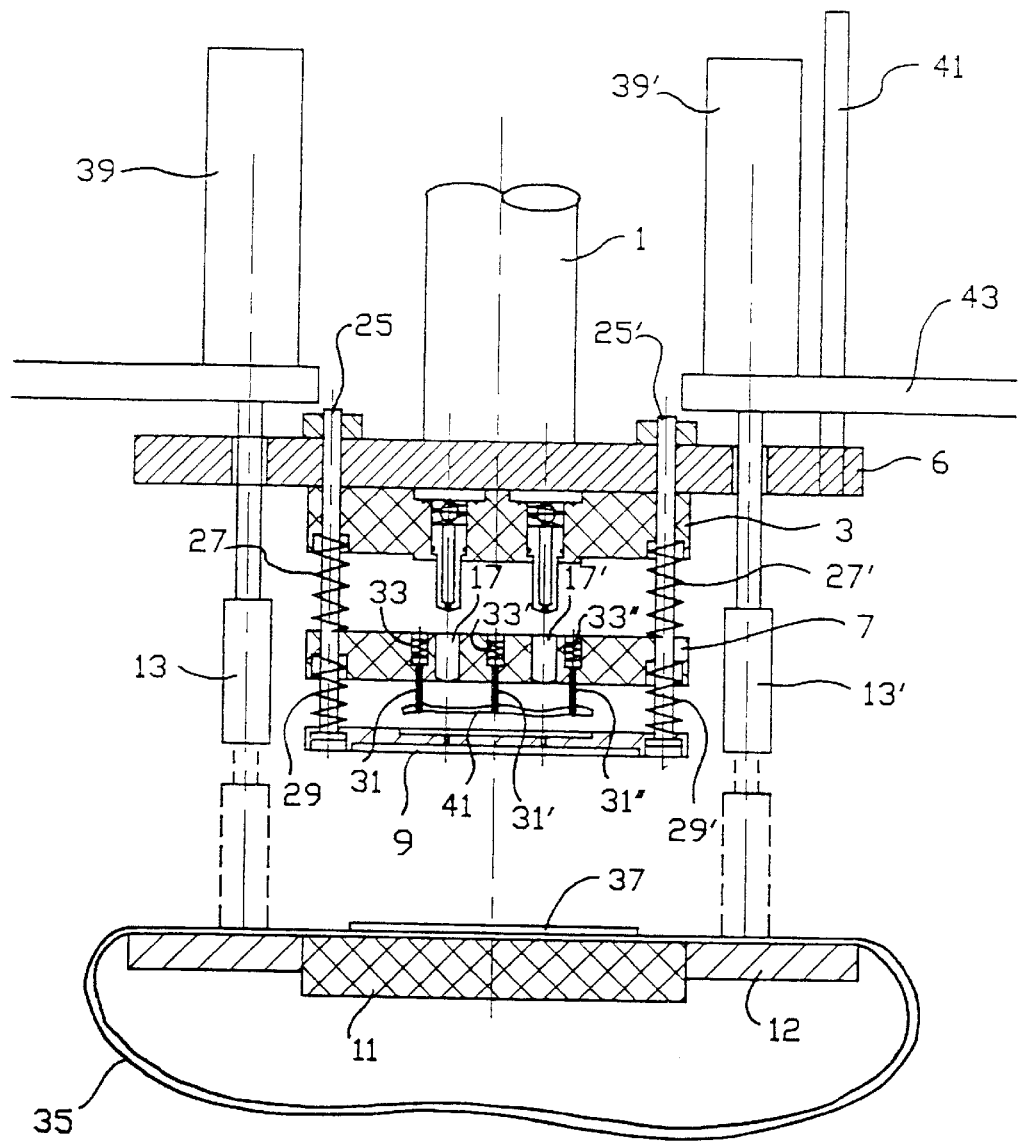
FIG. 4 depicts a front view of the apparatus of FIGS. 2 and 3 in home position after silicone has been injected and cured.

Referring now to FIGS. 2–4, the apparatus for molding and curing silicone will be more thoroughly described. Attached to the top plate 6 located at the end of the press 1, is the manifold plate 3 which may be liquid cooled. Within the manifold 3 are ports which lead to silicone injection nozzles 5, 5' ("nozzles"). The nozzles are in fluid flow relationship with the ports within the manifold which are in fluid flow relationship with the pump (not shown) which pumps the mixed silicone constituents through conduits into the manifold plate and through ports within the plates into the nozzles 5, 5'. The nozzles 5, 5' are located within chambers of the manifold plate 3 and are allowed to move in the direction of linear translation of the press 1 relative to the manifold plate 3. The nozzles 5, 5' may be biased in the manifold plate 3 using springs 15, 15'. These springs are compressed between the nozzles and a portion of the manifold plate to bias the nozzle towards the lower direction, i.e., towards the bottom platen 11.

Located below the manifold plate is a top platen 7 which is linearly translatable relative to the manifold plate 3 and nozzles 5, 5' therein. The top platen 7 is aligned with the nozzles 5, 5' within the manifold plate 3 so that the nozzles 5, 5' are aligned with nozzle receptacles 17, 17' along the linear axis of translation of the press 1. The top platen 7 and the bottom platen 11 are heatable and may be heated by, for example, contact with a heat source, such as an electric heating element, running steam therethrough or by any other suitable means.

Located below the heated top platen 7 and aligned therewith is a mold plate 9. The mold plate 9 contains a mold cavity 19 on the bottom side and a runner cavity 21 on the top side. Passages connect the mold cavity 19 with the runner cavity 21. The mold cavity 19 faces the bottom platen 11 and the area defined therebetween when the mold plate contacts the bottom platen 11, or a bottom mold plate (not shown), and defines the area where silicone is molded and cured. The mold plate 9 is aligned along the axis of linear translation of the press 1 and is translatable along that direction relative to the press 1, relative to the heated top platen 7, and relative to the manifold plate 3. The top platen 7 and mold plate 9 are aligned so that when the mold plate 9 contacts the top platen 7, the nozzle receptacles 17, 17' in the top platen are aligned to allow silicone, flowing through the nozzles 5, 5' within the nozzle receptacle 17, 17', to flow into the runner cavity 21 of the mold plate 9. Since the nozzle receptacles extend through the top platen 7 when the nozzles 5, 5' are inserted into the receptacles, the nozzles are directly aligned, and exposed to, the runner cavity 21.

The apparatus includes a system or means for allowing each of the manifold plate 3, top platen 7 and mold plate 9 to be linearly moveable along the axis of linear translation of the press 1, relative to one another. Such a system may include one or more, but preferably four, pins. A pair of pins 25, 25' which extend through the top plate 6 of the press 1 is shown in FIGS. 2–4. The pins extend through apertures in each of the manifold plate 3, top platen 7, and mold plate 9. The pins may be locked in place by any suitable means or locking mechanisms such as a collar. The pins are oriented in a direction parallel to the axis of linear translation of the press 1 and insure that the top platen and mold plate move in the same linear direction. Four compression springs, two of which are shown in FIGS. 2–4, 27, 27' may be placed between the manifold plate 3 and top platen 7, preferably around each of the pins 25, 25', respectively. Four additional compression springs, two of which are shown in FIGS. 2–4, 29, 29' may be located between the top platen 7 and mold plate 9, preferably around each of the pins 25, and 25', respectively. The springs 27, 27', 29, 29' bias the system in the home or open position as shown in FIG. 4. Accordingly, the pins and springs, function together as a means for biasing the system in the home position. Other means and techniques may be used to bias the system in the home position as shown in FIG. 4 and the invention is not limited to any one particular technique. For example, in lieu of springs, fluid activated pistons or push rods may be used to control the positioning of the top platen 7 and mold plate 9.

Located within the apparatus is a runner removal system. Referring still to FIG. 4, the runner removal system may include a plurality of runner lift off fingers 31, 31', 31''. These runner lift off fingers may be linearly translatable along the axis of translation of the press relative to the heated top platen 7 and extend downwardly therefrom towards the mold plate 9. The runner lift off fingers 31, 31', 31'', are aligned with the runner cavity 21 of the mold plate 9. The runner lift off fingers are oriented to depress within the top platen 7 when the apparatus is in the closed position as shown in FIG. 2. Springs 33, 33", and 33" may be used to bias the runner lift off fingers 31, 31', 31", in the open position as is shown in FIG. 4. The springs may be placed in compression within the top platen 7 to push the runner lift off fingers 31, 31', 31", in the home or open position. Other means for placing the runner lift off fingers in the open position (as shown in FIG. 4) and the closed position (as shown in FIG. 2) and any intermediate positions therebetween may also be used and the invention is not limited to any particular means.

When the apparatus is used to mold silicone on a substrate, such as a fabric 35, located on a bottom platen 11, means for securing the substrate to the bottom platen may be used. As shown in FIGS. 2–4, one such means includes a one or more push rods 13, 13' extending from pressurized cylinders 39, 39'. The cylinders are pressurized with fluid, such as air, under controlled pressure. The cylinders push the push rods 13, 13' in the linear direction of translation of the press 1 to contact the substrate 35 as is shown in FIGS. 2 and 3, and pull the push rods in the opposite direction. Also, a means for preventing the press and top plate from rotating may be used in the system. As shown in FIG. 4, this means may include an anti-rotation rod 41 which is affixed to the top plate 6 and extends through an aperture within any fixed structure 43.

Operation of the system to mold and cure silicone on a substrate such as fabric will now be described. At the beginning of a molding cycle, the apparatus is in the home position as depicted in FIG. 4. The silicone flowing through the manifold plate 3 is cooled to approximately 70–80° F. by liquid such as water flowing through the manifold plate 3 while the top platen 7 is heated to approximately 350° F. In this position, no silicone is injected through the nozzles. The bottom platen 11 is heated to about 350°–400° F. The press is actuated and the apparatus is moved into the injecting position as shown in FIG. 2. In this position, the nozzles 5, 5', are inserted into the nozzle receptacles 17, 17', of the heated top platen 7 and the heated platen 7 is contacting the top of the mold plate 9 so that the nozzles are aligned with the runner cavity 21 and the runner lift off fingers are within the runner cavity 21. The manifold plate 3 contacts the heated top platen 7 near the nozzles 5, 5'. Silicone is then injected through the nozzles into the runner cavity 21 of the mold plate 9. This silicone flows from the runner cavity 21 under pressure from the pump (not shown) through passages into the mold cavity 19. The cooling of the silicone while flowing through the nozzles 5, 5', prevents the silicone from curing while it is being injected into the mold plate 9. After the silicone has been fully injected into the mold cavity 19 of the mold plate 9 the press 1 is lifted and the top plate 6 and manifold 3 are lifted so that the nozzles are removed from the nozzle receptacle 17, 17'. The apparatus is then in the curing position where the manifold plate 3 does not contact the heated top platen 7, but the heated platen 7 contacts the mold plate 9. The heated platen 7 heats the mold plate 9 to a temperature sufficient to facilitate the curing of the silicone within the mold cavity 19. Typically, the silicone will be cured at or about a temperature of 350° F. Within approximately one to two minutes, the silicone should be fully cured and the press activated so that the apparatus is brought into the open position as shown in FIG. 4.

In this open position, the heated top platen is lifted from the mold plate 9 by the force imparted by springs 29, 29'. When the press is initially activated to lift the top plate so that the apparatus is moving from the curing position to the home position, the push rods 13, 13', contact the substrate 35 to separate the molded silicone 37 bonded thereto from the mold plate 9. Thereafter, the push rods may be lifted via the air cylinders 39, 39', 50 that the substrate 35, such as an article of clothing made of a fabric material, may be removed from the heated bottom platen. Heating of the bottom platen facilitates the curing of the silicone during the curing step as shown in FIG. 2. When the apparatus is placed in the home position such as shown in FIG. 4, springs 33, 33', and 33" push the runner lift off fingers 31, 31', 31", in the open position, i.e., downward away from the heated top platen 7. However, since these runner lift off fingers 31, 31', 31" were within the runner cavity 21 of the mold plate 9, they were embedded into the runner silicone therein. Once the silicone has cured during the curing step, the movement of the apparatus into the home position allows the runner lift off fingers 31, 31', 31", to pull the runner silicone 41 out of the runner cavity 21. The runner silicone can then be removed from the lift off fingers 31, 31', 31" by any means including the means directed below.

Lifting of the top plate 6 and manifold plate 3 from the injecting position as shown in FIG. 2, to the curing position as shown in FIG. 3, allows the springs, 27, 27' to push the heated top platen 7 away from the manifold plate 3 as is shown in FIG. 3. Similarly, when moving the system from the curing position into the home position as shown in FIG. 4, by activating the press 1, springs 29, 29', push the mold plate 9 away from the heated top platen 7. Accordingly, by use of springs 27, 27', 29, 29', the manipulation of the system from the injecting position, to the curing position, to the home position, and back to the injecting position, may be accomplished by controlling only the position of the top plate 6 by lifting and lowering the press 1.

Figure 5:
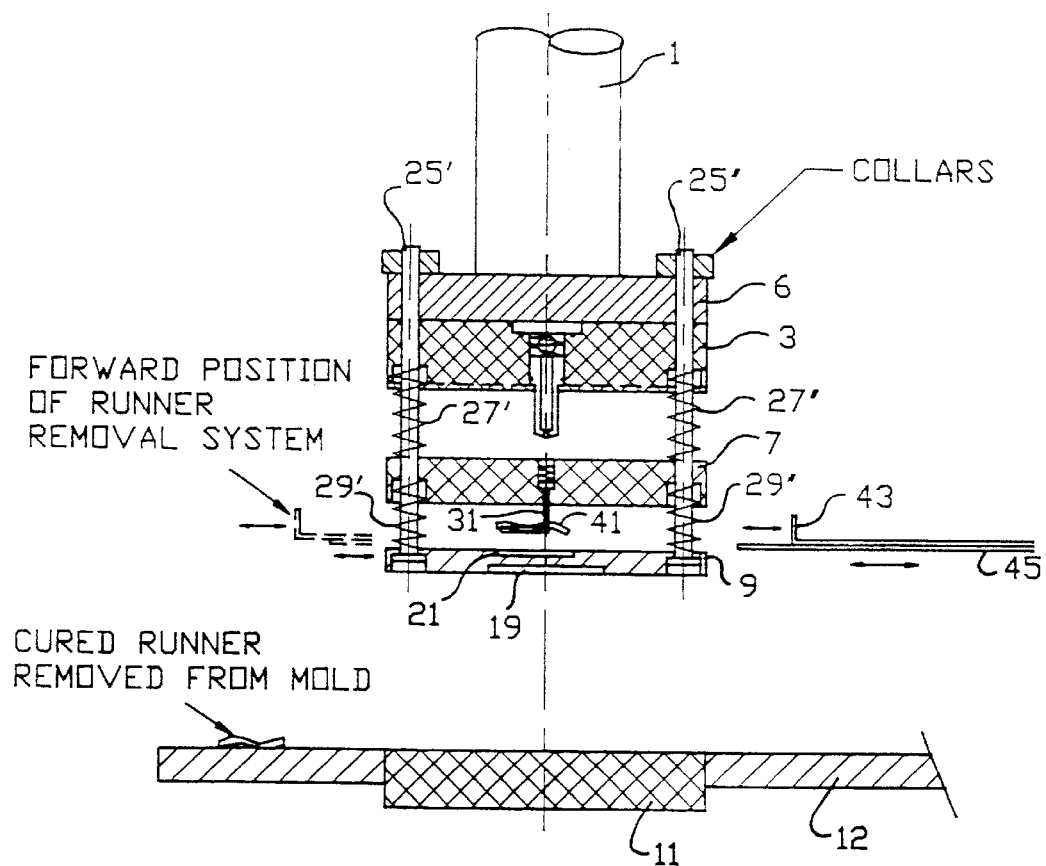
FIG. 5 depicts a side view of the apparatus shown in FIGS. 2, 3 and 4 in the home position including the runner removal system

Referring now to FIG. 5, a side view of the press 1, top plate 6, manifold plate 3, heated platen 7, and mold plate 9 is shown. As can be seen from FIG. 5, four sets of pins such as those depicted by reference numbers 25, 25', and 25", one on each corner of the top plates, top plate 6, manifold plate 3, heated top platen 7, and mold plate 9 may be used. Additionally, four compression springs, such as those depicted by reference numbers 27, 27', and 27", may be located between the manifold plate 3 and heated top platen 7 to bias the apparatus in the open position and push the top platen 7 away from manifold 3. Additionally, four compression springs such as those depicted by reference numerals 29, 29, and 29", may be located between the heated top platen 7 and the mold plate 9 to push the mold plate 9 away from the heated top platen 7 and bias the apparatus in the open or home position. Also, the heads of the pins, such as that depicted by reference numbers 25, 25', 25", are recessed within the mold plate 9 so as to not impede with the contact between the mold plate 9 and the heated bottom platen 11.

Referring still to FIG. 5, the runner remover system is also shown. After the injecting and curing stages have ended and the apparatus is placed in the home position as shown in FIGS. 4 and 5, the runner lift off fingers will lift the runner silicone 41 out of the runner cavity 21. Located at the same horizontal plane as the runner silicone 41 are a plurality of tines 43 which may travel in a direction normal to the axis of linear translation of the press 1. The tines 43 may be linearly translated from a first position directly in the rear of the runner silicone 41 to a second position in front of the mold plate 9. While the tines travel from the first position to the second position, they will contact the runner silicone 41 and separate the same from the lift off fingers 31, 31', 31". The metal plate 45 also moves with the tines so that when the runner silicone 41 is separated it will fall on the metal plate 45 which also translates along with tines 43 from a first position near the second position. After the runner silicone 41 has fallen onto the metal plate, however, tines 43 continue to translate towards the second position so that the runner silicone 41 will fall from the metal plate, preferably onto the bottom table 12.

Figure 6:
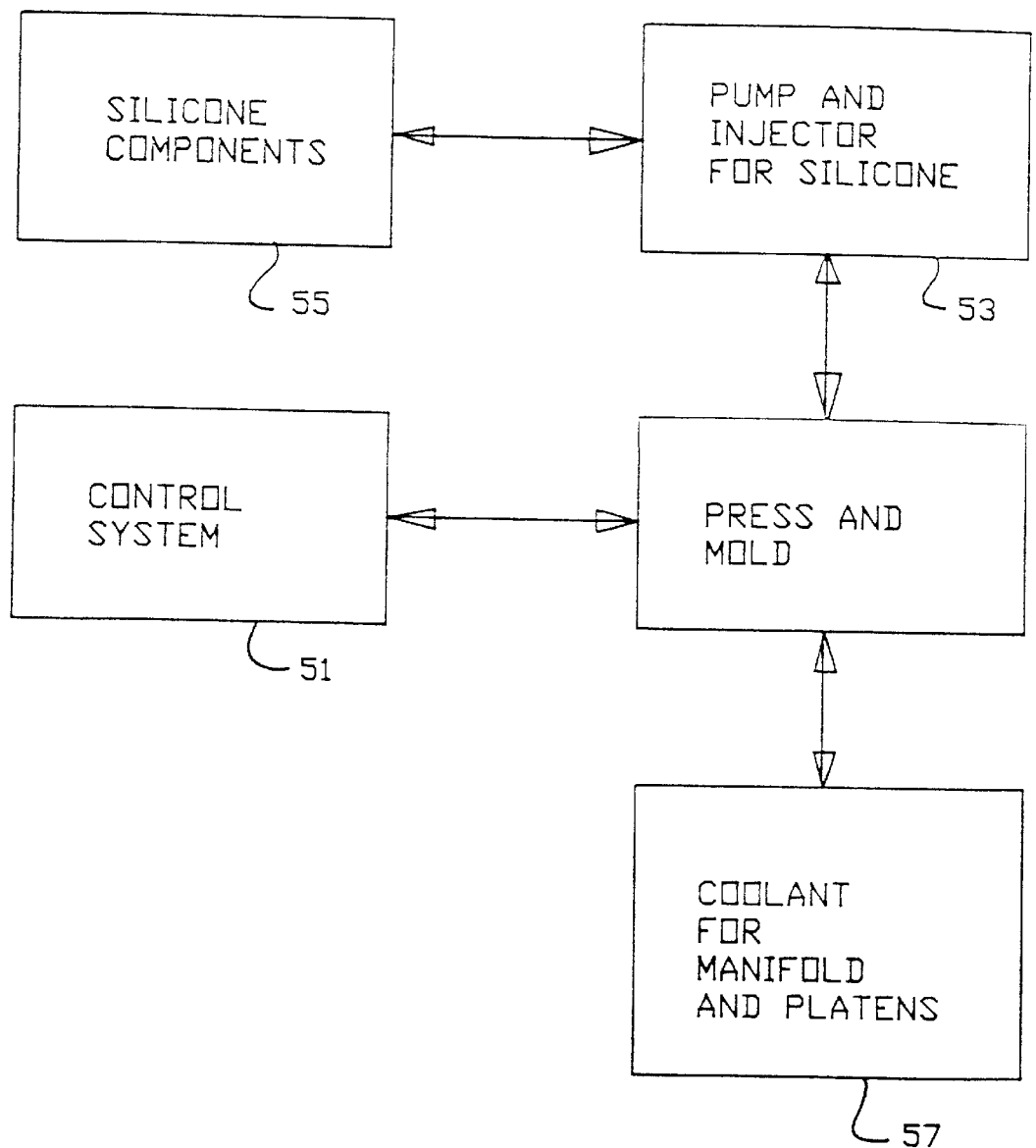
FIG. 6 depicts a block diagram depicting various components and/or systems used to operate the apparatus depicted in FIGS. 1–5 in order to mold and cure silicone in accordance with the principles of the present invention.

FIG. 6 depicts a schematic block diagram of various components which may be used with the apparatus depicted in FIGS. 2–5. The apparatus is coupled to a control system 51. The control system controls the pumping of the silicone from a pump and injector 53 which mixes the silicone components 55 and feeds controlled amounts of the same into the nozzles 5, 5', as shown in FIGS. 2–5. The control system 51 may also control the coolant from a coolant supply 57 which flows through the manifold 3. In addition, the control system may also control the heating of the bottom and top platens 11, 7, respectively, as well as the positioning of the press 1, the push rods 13, 13', various valve and fluid control mechanisms for the control of the components used to mix silicone, silicone pumped from the pump through the nozzles, various coolants (such as water) used to cool the manifold 3, and/or heating elements or agents (such as steam) used to heat the top platen 7 and bottom platen 11. For example, the control system includes various sensors which sense the position of the press 1, top platen 7 and mold plate 9. Based upon the sensed positions, valves controlling the flow of silicone, coolant and/or heating fluid may be opened and/or closed. In addition, the control system may control the position of the push rods 13, 131, and the pressurization of fluid used to control the positions of the same. Also, if means other than compression springs are used to control the position of the top platen 7 and mold plate 9 relative to each other and relative to the manifold 3, the control system may be used to control the positioning of these items of the apparatus to ensure proper positioning in the home, curing and injecting positions. For example, if hydraulic or pneumatic means are used to control the position of the top platen 7 and/or mold plate 9, the control system may be used to control the same. Typically, the control system will comprise a computer or other microprocessor control system.

Pumps which are sufficient to deliver a different silicone components to a mixer block to be mixed into a silicone for pumping into a molding system are disclosed in U.S. Pat. No. 5,072,649, the disclosure of which is incorporated by reference herein. A five gallon pump useable with the apparatus of the present invention is available from RJS Precision Products, Inc. of Latham, N.Y., U.S.A. Also, other items such as an injector useable in a control system to meter the precise amount of silicone into a mold cavity to be used with the apparatus are also available from RJS Precision Products, Inc.

Although the invention has been disclosed in conjunction with the embodiments depicted herein, it will be apparent to one of ordinary skill in the art that various modifications and substitutions may be made to these embodiments without departing in any way from the spirit and scope of the invention as defined by the following claims.

What is claimed is:

1. A method of molding and curing silicone, comprising:
   providing an apparatus, comprising at least one moveable nozzle, a movable cooling plate coupled to said at least one moveable nozzle, a heatable mold plate having a mold cavity therein;
   cooling the at least one moveable nozzle with the cooling plate;
   injecting silicone into the mold cavity via the at least one moveable nozzle; and
   curing the silicone by heating the heatable mold plate.

2. The method of claim 1, further comprising coupling at least one resilient member between the at least one moveable nozzle and the heatable mold plate.

3. The method of claim 2 wherein the at least one resilient member comprises at least one spring.

4. The method of claim 1, further comprising positioning the at least one moveable nozzle for injecting silicone into the mold cavity.

5. The method of claim 4, further comprising providing a substrate support plate, wherein the positioning comprises positioning the at least one moveable nozzle relative to the substrate support plate.

6. The method of claim 4, further comprising providing a substrate, wherein the positioning comprises positioning the at least one moveable nozzle relative to the substrate to allow the substrate to receive an application of silicone.

7. The method of claim 4, further comprising providing a press, wherein the positioning comprises positioning the at least one moveable nozzle using the press.

8. The method of claim 7, wherein the positioning comprises positioning the at least one moveable nozzle relative to a substrate support plate.

9. The method of claim 7, wherein the positioning comprises positioning the at least one moveable nozzle relative to a substrate to allow the substrate to receive an application of silicone.

10. A method of molding and curing silicone, comprising:
    providing an apparatus, comprising at least one moveable nozzle, a cooling plate coupled to said at least one moveable nozzle, a heatable mold plate having a mold cavity therein, and a substrate support;
    moving the at least one moveable nozzle relative to the substrate support;
    moving the cooling plate relative to the substrate support plate;
    cooling the at least one moveable nozzle with the cooling plate;
    injecting silicone into the mold cavity via the at least one moveable nozzle; and
    curing the silicone by heating the heatable mold plate.

11. The method of claim 10 wherein the substrate support comprises a substrate support plate.

12. An apparatus for molding and curing silicone, comprising:
    at least one moveable nozzle for injecting silicone;
    a substrate support plate;
    a cooling plate coupled to said at least one moveable nozzle for cooling said at least one moveable nozzle, said cooling plate being movable relative to said substrate support plate; and
    a heatable mold plate having a mold cavity therein for receiving silicone injected therein by said at least one movable nozzle.

13. The apparatus of claim 12, further comprising at least one resilient member coupled between said at least one moveable nozzle and said heatable mold plate.

14. The apparatus of claim 13, wherein said at least one resilient member comprises at least one spring.

15. The apparatus of claim 12, further comprising means for moving said at least one moveable nozzle to an injecting position.

16. The apparatus of claim 15, wherein said means for moving comprises a press coupled to said at least one moveable nozzle.

17. The apparatus of claim 12, further comprising means for heating said heatable mold plate.

18. The apparatus of claim 12, further comprising a substrate wherein said at least one moveable nozzle is movable relative to said substrate support plate.

19. The apparatus of claim 18, further comprising a press coupled to said at least one moveable nozzle, wherein said press is adapted to move said at least one moveable nozzle relative to said substrate support plate.

20. The apparatus of claim 12, wherein said at least one moveable nozzle is adapted to be moved relative to a substrate adapted to receive an application of silicone.

21. The apparatus of claim 20, further comprising a press coupled to said at least one moveable nozzle, wherein said press is adapted to move said at least one moveable nozzle relative to said substrate.

22. An apparatus for molding and curing silicone, comprising:
- at least one moveable nozzle for injecting silicone;
- a movable cooling plate coupled to said at least one moveable nozzle for cooling said at least one moveable nozzle;
- a heatable mold plate having a mold cavity therein for receiving silicone injected therein by said at least one movable nozzle; and
- a substrate support wherein said at least one moveable nozzle is adapted to be moved relative to said substrate support.

23. The apparatus of claim 22 wherein said substrate support comprises a substrate support plate.

* * * * *

UNITED STATES PATENT AND TRADEMARK OFFICE
CERTIFICATE OF CORRECTION

PATENT NO. : 6,692,677 B2
DATED : February 17, 2004
INVENTOR(S) : Styczynski

It is certified that error appears in the above-identified patent and that said Letters Patent is hereby corrected as shown below:

<u>Title page, Item [54] and Column 1, Lines 1-2,</u>
Title, delete "METHOD FOR MOLDING AND CURING SILICONE" and insert
-- APPARATUS AND METHOD FOR MOLDING AND CURING SILICONE --

<u>Column 9,</u>
Lines 3-4, delete "further comprising a substrate"

Signed and Sealed this

First Day of June, 2004

JON W. DUDAS
*Acting Director of the United States Patent and Trademark Office*